July 25, 1950  E. C. HARTWIG ET AL  2,516,570
TEMPERATURE CONTROL OF ELECTRIC RESISTANCE FURNACES
Filed Aug. 19, 1948  2 Sheets—Sheet 1

INVENTORS
Edward C. Hartwig
and James L. Reed.

July 25, 1950      E. C. HARTWIG ET AL      2,516,570
TEMPERATURE CONTROL OF ELECTRIC RESISTANCE FURNACES
Filed Aug. 19, 1948
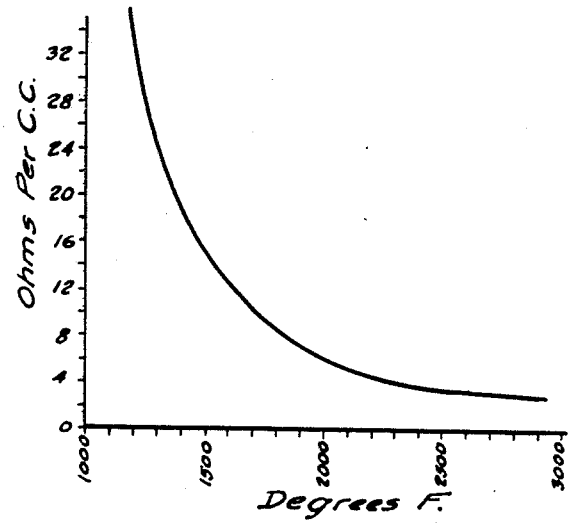
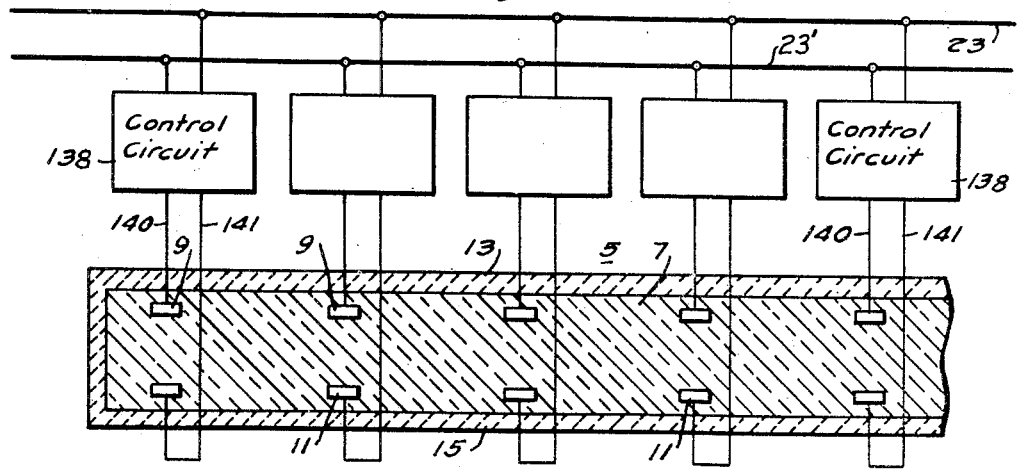

Patented July 25, 1950

2,516,570

UNITED STATES PATENT OFFICE 2,516,570

TEMPERATURE CONTROL OF ELECTRIC RESISTANCE FURNACES

Edward C. Hartwig, Tonawanda, and James L. Reed, Buffalo, N. Y., assignors to Westinghouse Electric Corporation, East Pittsburgh, Pa., a corporation of Pennsylvania Application August 19, 1948, Serial No. 45,026

5 Claims. (Cl. 13—34)

Our invention relates to the heating of material by the conduction of electric current therethrough and has particular relation to heating of vitreous material such as glass.

Experiments conducted with vitreous material such as glass at temperatures above its transformation point have uncovered the fact that at such temperatures the material is electrically conductive. During its manufacture or when it is being formed, vitreous material may, accordingly, be heated by transmitting electrical current therethrough. Attempts to heat vitreous material and particularly glass in this manner, however, have heretofore proved unsuccessful. When current is conducted through glass, the temperature of the glass cannot be maintained within the desired limits. The glass becomes excessively heated as current passes through it and is damaged or rendered entirely useless. In addition, the apparatus utilized for heating the glass may be damaged.

It is accordingly an object of our invention to provide apparatus for heating vitreous material, such as glass, by conducting electrical current therethrough.

Another object of our invention is to provide apparatus and a method for heating vitreous material such as glass by electrical conduction without exceeding prescribed temperature limits during its manufacture or while it is being molded.

A more general object of our invention is to provide apparatus for heating glass or any like material effectively, particularly during its manufacture or while it is being formed or combined with other components.

Our invention arises from our realization that the resistance-temperature characteristic of glass and similar vitreous materials such as porcelain is sharply negative. When such a material is heated by conducting electrical current therethrough its resistance decreases as its temperature increases. The decrease in resistance of the material results in an increase in the current flow through the material which in turn results in a further decrease in the resistance. This phenomenon is cumulative; the current in a short time becomes excessively high and the material is damaged or deteriorated. Since the heated material, while undergoing such treatment, becomes in effect a short circuit across its current source, the source may be damaged by overheating.

In the preferred practice of our invention, power is supplied to the material to be heated through tubes of the ignitron type. An important aspect of our invention arises from our realization that the material constitutes a substantially non-inductive load on the system including the power supply and the ignitrons. The power factor of such a non-inductive system is approximately one, and the potential supplied may be substantially in phase with the current. When the operation of the system is initiated, the ignitrons may be fired late in the half-periods of the supply. As the material rises in temperature and its resistance decreases, firing current is conducted through the igniters earlier and earlier in the half-periods. Eventually the firing current begins to flow near the beginnings of the half-period when the anode potentials are too low to fire the ignitrons. The igniters thus conduct current for excessively long intervals before the anodes take over. Igniters operating under such conditions are damaged.

In accordance with our invention, we provide apparatus for heating the material which includes provisions for maintaining the current flow through the material substantially uniform as its resistance decreases. In the practice of our invention, the material is properly heated and neither it nor the apparatus from which the heating current is supplied is damaged.

The novel features that we consider characteristic of our invention are set forth with particularity in the appended claims. Our invention, however, both as to its organizations and its method of operation, together with additional objects and advantages thereof will be understood from the following description of a specific embodiment when read in connection with the accompanying drawing in which:

Fig. 2 is a graph on which is plotted the resistance of glass as a function of temperature; and Fig. 3 is a diagrammatic view showing the important features of a modification of our invention.

Figure 1:
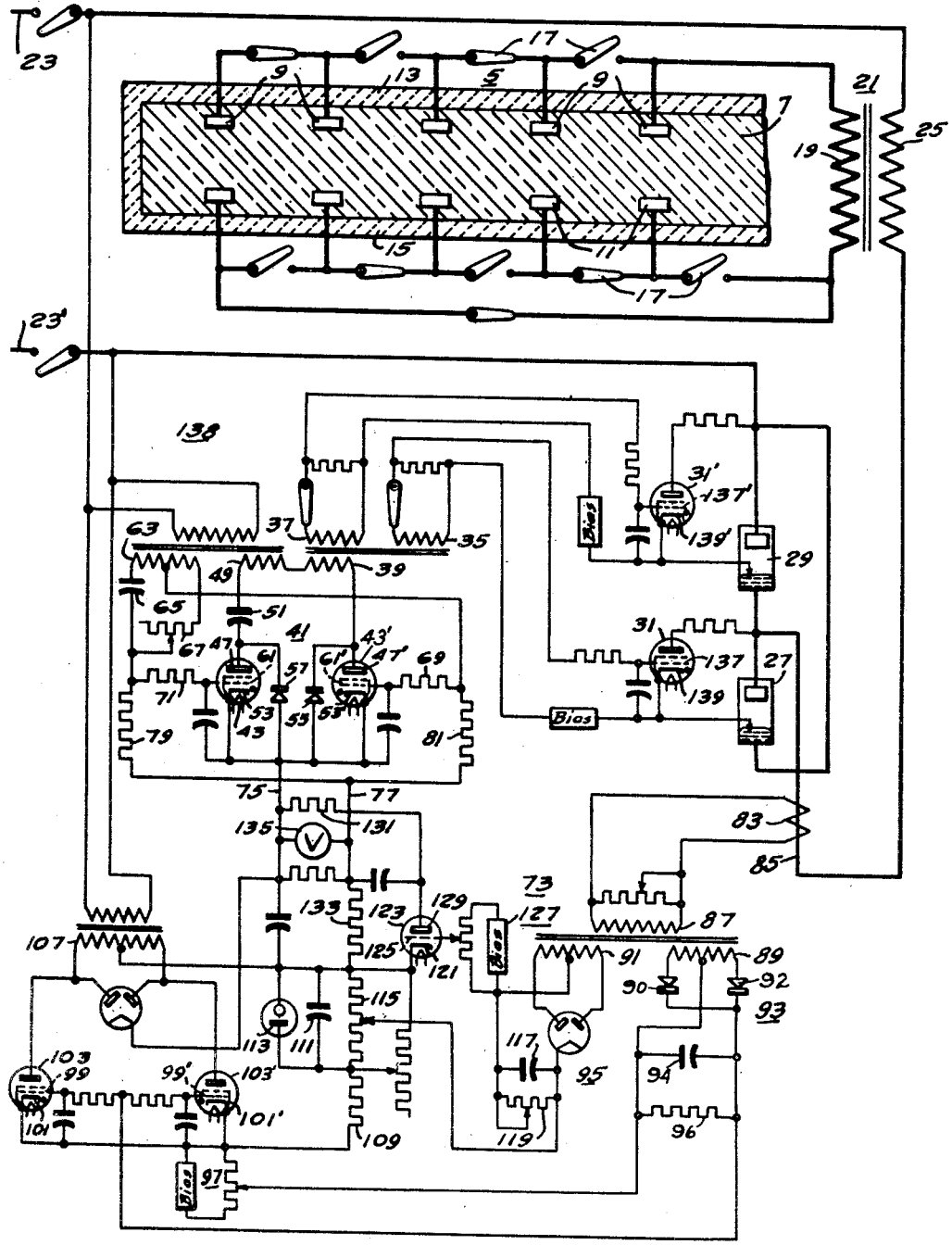
Figure 1 is a circuit diagram of a preferred embodiment of our invention.

The apparatus shown in Fig. 1 includes a refractory tank 5 through which glass 7 or other similar material flows while it is being produced or formed. At spaced intervals a plurality of electrodes 9 and 11 respectively project through opposite walls 13 and 15 of the tank. Switches 17 are provided between the electrodes to connect them in any desired manner. In Fig. 1, the switches 17 are shown as set to connect together the first and second and third and fourth electrodes from the left projecting through the upper wall 13 and the second and third and fourth and fifth from the left projecting through the other wall 15. The extreme right-hand electrode 9 projecting through the upper wall 13 and the extreme left-hand electrode 11 projecting through the lower wall 15 are connected together through the secondary 19 of a transformer 21. Potential existing across the secondary 19 causes current to flow through the material between the electrodes 9 and 11 in complex paths. Among these are a direct path extending between the successive electrodes in series and numerous indirect paths through the material between each of the electrodes and the others.

Power for heating the material 7 is derived from alternating-current buses 23 and 23' which may be of the usual commercial sixty-cycle type of any nominal voltage between 200 and 2300. The buses are connected across the primary 25 of the transformer through a pair of electric discharge paths 27 and 29 which are inversely connected in parallel. Where the power requirements are substantial, the discharge paths should preferably be ignitrons. In certain situations, thyratrons or even high-vacuum tubes may prove satisfactory.

Ignition current for each of the discharge paths 27 or 29 is supplied from the line conductors 23 and 23' through a thyratron 31 or 31' respectively. Each of the thyratrons 31 or 31' is controlled from a separate secondary 35 or 37 respectively of a pulsing transformer, the primary 39 of which is supplied from a phase control network 41.

The latter network includes a pair of thyratrons 43 and 43'. The anode 47 of one thyratron 43 is connected to one terminal of a secondary 49 of a supply transformer through a capacitor 51. The anode 47' of the other thyratron 43' is connected to the other terminal of this secondary 49 through the primary of the pulse transformer 35—37—39. The cathodes 53 and 53' of the thyratrons 43 and 43', respectively, are connected together. Across each of the thyratrons a rectifier 55 or 57 is connected in such a sense as to conduct current when the other of the pair of thyratrons is rendered conductive.

To control the thyratrons 43 and 43' a composite potential is impressed between the control electrodes 61 and 61' and the cathodes 53 and 53' of each thyratron. This composite potential is made up of an alternating-current component displaced in phase with reference to the anode-cathode potential and a direct-current component. The alternating component is derived from a secondary winding 63 of the supply transformer. Across this winding a capacitor 65 and a rheostat 67 are connected in series. The control electrode 61' of the thyratron 43' is connected to an intermediate tap of the secondary 63 through a resistor 69 and the control electrode of the other thyratron 43 is connected through another resistor 71 to the junction of the capacitor 65 and the rheostat 67. The direct-current component is derived from a network 73 responsive to the current through the heating transformer primary 25. One of the terminals 75 of this network is connected to the cathodes 53 of the thyratrons and the other terminal 77 is connected to the control electrodes 61 and 61' through resistors 79 and 81 respectively.

The current-responsive network 73 is energized from a current transformer 83 coupled to the conductor 85 between the main discharge paths 27 and 29 and the terminal of the primary 25 to which they are connected. The current transformer supplies power to a control transformer provided with a single primary 87 and a pair of secondaries 89 and 91 respectively. Each of the secondaries 89 or 91 supplies a full-wave rectifier 93 or 95 respectively. Full wave rectifier 93 comprises a pair of dry rectifiers 90, 92 and a filter network which includes a capacitor 94 and a resistor 96. The output of the rectifier 93 is impressed through a bias 97 between the control electrodes 99 and 99' and the cathodes 101 and 101' of a pair of thyratrons 103 and 103' connected in push-pull across the secondary 107 of a supply transformer. The anode circuits of these thyratrons 103 and 103' are connected through a resistor 109 in series with a capacitor 111 so that the capacitor is charged by the current flow through the thyratrons. A voltage regulator tube 113 and a rheostat 115 are each connected across the capacitor 111. The regulator 113 is selected to break down at a voltage corresponding to the lowest desired current flow through the load primary 25. It is to assure that this occurs that the push-pull connected thyratrons 103 and 103' are interposed between the rectifier 93 and the capacitor 111. The thyratrons provide the necessary amplification at low currents.

Another capacitor 117 is charged from the other rectifier 95. Another rheostat 119 is connected across the latter capacitor.

The plate of the first capacitor 111 which is charged negative is connected to the cathode 121 of a high-vacuum tube 123. The control electrode 125 of this tube is connected to the adjustable tap of the first rheostat 115 through the second rheostat 119 and a bias 127. The anode 129 of the tube 123 is connected through a resistor 131 to the output terminal 75 of the network 73; the cathode 121 of the high-vacuum tube is connected through a second resistor 133 to the other output terminal 77.

The potential derived from the first rheostat 115 is for any setting of this rheostat determined by the voltage regulator 113 and is independent of the current flow through the material 7. This potential is so impressed as to increase the conductivity of the high-vacuum tube 123. The potential derived from the second rheostat 119 is dependent on the current conducted through the material 7. It is so impressed as to counteract the potential derived from the first rheostat 115.

Before the operation is initiated, the load-current responsive network is so set that the potential between the output terminals 75 and 77, as indicated on an instrument 135, is zero and the rheostat 67 in the phase-shift network is set at a magnitude corresponding to the desired current.

When the operation is initiated, one of the thyratrons 43 or 43' is rendered conductive at an instant in half-period of the supply predetermined by the setting of the rheostat 67. Assume that the thyratron 43 is first rendered conductive. A current pulse flows to charge the capacitor 51 from the left-hand terminal of the secondary 49 through the capacitor 51, the thyratron 43, the right-hand rectifier 55, the primary 39 of the pulse transformer to the right-hand terminal of the secondary 49. A potential pulse is induced between the control electrode 137 or 137' and the cathode 139 or 139' of one of the firing thyratrons 31 or 31' which is of the proper polarity to render it conductive and the associated ignitron 27 or 29 is rendered conductive. Current of one polarity is then conducted through the primary 25 of the load transformer 21 and through the material 7. During the succeeding half-period, the other thyratron 43' is rendered conductive and the capacitor 51 is discharged and recharged through the primary 39 of the pulse transformer and the now conductive thyratron. A potential pulse is now induced in the pulse transformer to render the other firing thyratron 31 or 31' conductive. The associated ignitron is now rendered conductive and current of the opposite polarity flows through the load transformer and the material 7. The firing thyratrons 43 and 43' continue to conduct alternately and alternating current of a magnitude determined by the initial setting of the phase control rheostat 67 flows through the load 7.

Current flow through the primary 25 of the load transformer 21 induces potentials across the secondaries 89 and 91 of the current-responsive network 73. The thyratrons 103 and 103' connected in push-pull are now rendered conductive producing a potential as determined by the regulator 113 across the rheostat 115. A potential dependent on the setting of the rheostat 115 is now impressed between the control electrode 125 and the cathode 121 of the high-vacuum tube 123 in such a sense as to increase its conductivity. At the same time, a potential of opposite polarity dependent on the load current is impressed through the other rheostat 119. Initially the potential impressed from the rheostat 119 just counteracts the potential impressed from the rheostat 115 and the potential across the output terminals 75 and 77 is zero. The instants in the half-periods of the supply are determined only by the setting of the rheostat 67.

In Fig. 2, resistance in ohms per cubic centimeter for a typical glass is plotted vertically; temperature in degrees Fahrenheit is plotted horizontally. According to the curve for this glass which reproduced in Fig. 2, the resistance decreases sharply as the temperature increases. If a substantially constant potential is impressed across such glass, it soon becomes excessively heated. The system shown in Fig. 1 operates to prevent this overheating from occurring.

As the resistance of the material 7 decreases, the current flow through it tends to increase. This increased current flow increases the negative potential impressed in the control circuit of the high-vacuum tube 123 from the rheostat 119 correspondingly decreasing the conductivity of the tube. The positive potential of the anode 129 of the tube and of the cathodes 53 and 53' of the thyratrons 43 and 43' now increases and these thyratrons are rendered conductive later in the half-periods of the supply. Current flow through the load 7 is decreased. The decreased current flow reduces the negative potential in the control circuit of the tube 123 in turn tending to increase the current flow which in turn tends to again decrease the current flow. The load current is thus maintained substantially constant. The current flow through the glass does not become excessive and the glass does not become excessively heated.

By the operation of the tube 123 and its associated circuits, the instants when the firing current through the ignitrons 27 and 29 is initiated are maintained within narrow limits, at the point determined by the setting of the rheostat 67. The rheostat is so set as to avoid initiating the flow of current through the ignitrons early in the half-periods of the supply.

In the modifications shown in Fig. 3, the pairs of electrodes 9 and 11 of the treating chamber 5 are each supplied independently from a control system 138 of the type shown in Fig. 1. The output terminals 140 and 141 of said system are connected respectively to the electrodes 9 and 11. A system of the type shown in Fig. 3 is to be preferred in situations in which it is desirable that the current be transmitted through a predetermined mass of the material 7 to be disposed between each pair of electrodes 9 and 11 in turn as the material passes between these electrodes.

In a system such as is shown in Fig. 3, the heating process may be set in accordance with a predetermined program by presetting the rheostats 67 in each of the systems. For example, the current flow through the material as it passes through the tank may be progressively increased or decreased. If desired, the current flow may be increased until the material passes beyond the center pair of electrodes 9 and 11 and thereafter decreased.

As shown and described herein, our invention is applied to the heating of material which has a negative resistance-temperature coefficient. In one of its specific aspects, it may also be applied to the heating of material having a substantial positive resistance-temperature coefficient. For example, as aluminum is anodized its resistance increased. Our invention may be applied to anodizing processes such as the anodizing of aluminum. In such a system, the conductors 140 and 141 are connected between the aluminum and the anodizing electrode.

While we have shown and described specific embodiments of our invention, we are fully aware that many modifications thereof are possible. Our invention, therefore, is not to be restricted except insofar as is necessitated by the prior art and by the spirit of the appended claims.

We claim as our invention:

1. The method of controlling the temperature of molten glass which comprises deriving pulses of electric current from a commercial alternating current source, said pulses having a duration of less than a period of said source; heating the glass by continuous passage of said pulses of electric current therethrough; deriving a control potential which is proportional to the magnitude of said pulses; and continuously changing the time duration of each of said pulses in accordance with the magnitude of said control potential.

2. The method of controlling the temperature of molten glass which comprises deriving pulses of electric current of alternately opposite polarity, from a commercial alternating current source said pulses having a duration less than a period of said source; heating the glass by continuous passage of said pulses of electric current therethrough; deriving a control potential which is proportional to the magnitude of said pulses; and continuously changing the time duration of each of said pulses in accordance with the magnitude of said control potential.

3. The method of controlling the temperature of molten glass which comprises deriving pulses of electric current from a commercial alternating current source said pulses having a duration of less than a period of said source; heating the glass by continuous passage of said pulses of electric current therethrough; deriving a control potential which is proportional to the magnitude of said pulses; and varying the total current passed through the glass by continuously changing the time duration of each of said pulses in accordance with the magnitude of said control potential.

4. The method of controlling the temperature of molten glass which comprises deriving pulses of electric current from a commercial alternating current source said pulses having a duration of less than a period of said source; heating the glass by continuous passage of said pulses of electric current therethrough; deriving a control parameter which is proportional to the magnitude of said pulses; and varying the total current passed through the glass by continuously changing the time duration of each of said pulses in accordance with the magnitude of said control parameter.

5. The method of controlling the temperature of molten glass by conducting current therethrough from an alternating current supply with apparatus including at least one electric discharge path defined by principal electrodes which electrodes are interposed between said glass and said supply and means for controlling the conductivity of said path which comprises rendering said path conductive during portions of successive periods of said supply and continuously setting the durations of said portions at magnitudes such that said glass is maintained at the desired temperature independently of its electrical resistance.

EDWARD C. HARTWIG.
JAMES L. REED.

REFERENCES CITED

The following references are of record in the file of this patent:

UNITED STATES PATENTS

| Number | Name | Date |
|---|---|---|
| 1,320,071 | Lehr | Oct. 28, 1919 |
| 1,913,580 | Altshuler et al. | June 13, 1933 |
| 2,000,278 | Ferguson | May 7, 1935 |
| 2,018,883 | Ferguson | Oct. 29, 1935 |
| 2,027,405 | Smede | Jan. 14, 1936 |
| 2,083,190 | Dawson | June 8, 1937 |
| 2,126,398 | Knowles | Aug. 9, 1938 |
| 2,158,135 | MacFarlane | May 16, 1939 |
| 2,181,030 | Thomas | Nov. 21, 1939 |
| 2,186,718 | Ferguson | Jan. 9, 1940 |
| 2,231,582 | de B. Knight et al. | Feb. 11, 1941 |
| 2,231,695 | Vedder | Feb. 11, 1941 |
| 2,232,541 | Levoy | Feb. 18, 1941 |
| 2,248,968 | Dawson | July 15, 1941 |
| 2,277,847 | Dawson | Mar. 31, 1942 |
| 2,280,101 | Slayter et al. | Apr. 21, 1942 |
| 2,314,956 | Slayter et al. | Mar. 30, 1943 |
| 2,440,932 | Cooper et al. | May 4, 1948 |